Dec. 27, 1927.

R. C. BENNER 1,653,614

STORAGE BATTERY SEPARATOR

Filed Oct. 9, 1922

Inventor:
Raymond C. Benner,
By Byrnes, Townsend & Brickenstein,
Attorneys.

Patented Dec. 27, 1927.

1,653,614

UNITED STATES PATENT OFFICE.

RAYMOND C. BENNER, OF BAYSIDE, NEW YORK, ASSIGNOR, BY MESNE ASSIGNMENTS, TO PREST-O-LITE STORAGE BATTERY CORPORATION, A CORPORATION OF INDIANA.

STORAGE-BATTERY SEPARATOR.

Application filed October 9, 1922. Serial No. 593,427.

This invention relates to storage batteries and particularly to improved separators therefor.

Storage battery separators have heretofore been formed by felting together fibrous materials such as sulfite wood fiber or pulp which is substantially free from substances which are or may be detrimental in the operation of the storage battery. Such sulfite fiber has also been impregnated with a soluble silicate, as water glass for example, either before being formed into sheets or after the sheets of sulfite fiber board have been fabricated. Such silicated separators have a higher resistance than plain sulfite pulp separators of the same thickness but are superior to the latter since the soluble silicate in the pores thereof is adapted to form gelatinous silicic acid which is impervious to the usual battery sediment but is permeable to the acid electrolyte and electrolytic action.

A low internal resistance is highly desirable in storage batteries generally, and furthermore in radio, signal and vehicle batteries, where thick plates or block electrodes are preferable, greater plate space is necessary than is required in thin plate starting and lighting batteries.

The object of the present invention is therefore to provide a separator which offers a comparatively low internal electrical resistance and is relatively thin and amply protected against disintegration by the chemical action of the electrolyte and active material so that it may be placed face to face in abutment with the battery plates and thereby increase the space allowable for the plates in a given size cell. Generally speaking, these objects are attained by providing a separating means in which sodium silicate or a similar substance is applied only to the surface or surfaces thereof which are opposed to or abut against the positive plate or both positive and negative plates.

The principles of the invention may be applied in a number of ways to provide an improved separating means between the plates of a battery. In an assembly of plates and separating means, the latter may consist of successive sections, for example a relatively thin disintegration resistant separator adapted to face or abut against the positive lead peroxid plate and another desirably thicker separator of porous material between such thin separator and the negative plate. Another thin disintegration resistant separator may also be placed between the thicker separator and the negative plate, to face or abut against the latter. The improved separator is desirably made of felted sulfite wood fiber impregnated with sodium silicate, as more fully described in application Serial No. 530,943, filed in my name on January 21, 1922. The outer sections of the separating means hold the active material on the plates, prevent shedding and also prevent the passage of growths and sediment through the separating means, while the intermediate thicker section is untreated with sodium silicate or the like and is desirably quite porous so as to reduce the internal electrical resistance to a minimum.

In dry storage cells, especially, where the variation in the concentration of the acid electrolyte is greater than in the usual wet types of cells and where separators are pressed against the positive plates, the disintegrating action of the positive plates on the separators is greatly increased. Cases have been observed where the positive plate has burned its way through an ordinary wooden separator. In accordance with this invention, such wooden separators as well as sulfite fiber and other types of separators may be protected from oxidation and disintegration, without materially increasing the resistance they offer, by coating or impregnating one or both sides of the separators with sodium silicate or other similar substance. The sodium silicate, such as water glass solution fills the surface pores only and does not penetrate through the separator, thus producing a separating means which has outer or surface sections containing sodium silicate and an adjacent or intermediate section that is left in its original porous state which offers less internal resistance than if the same were silicated.

An improved unitary separator embodying this invention may be made by forming a relatively thick layer of sulfite wood pulp and placing on either or the opposite sides thereof relatively thin layers of silicated sulfite wood pulp, that is, pulp which has been treated with sodium silicate or an equivalent substance. The several layers are pressed together so as to provide a comparatively thin light unitary separator having facings or sections of silicated sulfite fiber and an intermediate section of sulfite fibers which are untreated with sodium silicate or a similar substance. Only the pores in one or both surface portions of the separator therefore contain sodium silicate and the intermediate section of sulfite fiber has its pores unobstructed so that the separator as a whole offers less internal resistance than a separator silicated throughout yet the same is amply protected against oxidation, disintegration and the passage of sediment.

For purposes of illustration I have shown various forms of the invention in the accompanying drawing, in which.

Figure 1:
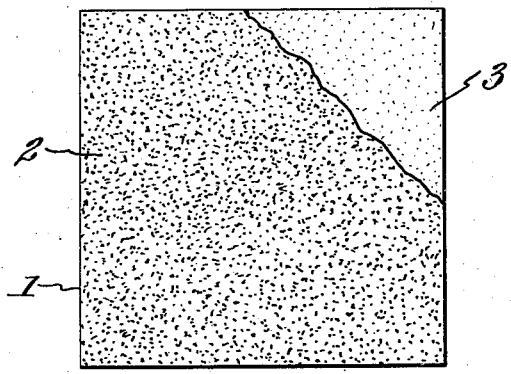
Fig. 1 is a front elevation of a separator composed of fibrous material having one surface impregnated with a soluble silicate, with a portion broken away to show the unsilicated portion beneath the surface.
Figures 2, 3, 4:
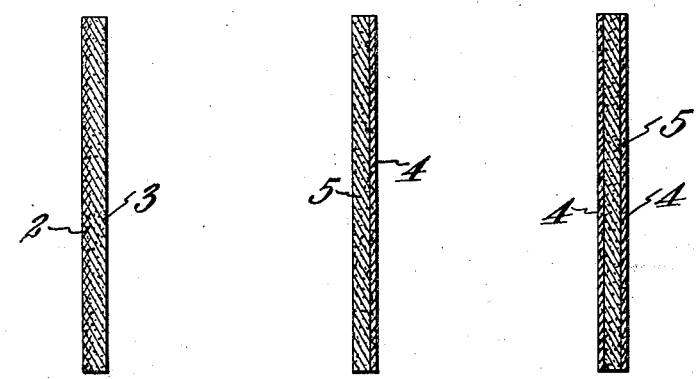
Fig. 2 is a vertical transverse section through a separator similar to that shown in Fig. 1.
Figs. 3 and 4 are vertical transverse sections through two forms of separators consisting of successive sections of silicated fibrous material and unsilicated fibrous material.

Referring to Figs. 1 and 2, 1 denotes a separator sheet of porous material such as felted sufite wood fiber having a surface portion 2 impregnated with sodium silicate or the like and a thicker portion 3 which is untreated.

Figs. 3 and 4 illustrate another form of the invention in which thin sheets 4 of impregnated porous material are placed on one or both sides of a thicker sheet 5 of untreated material.

While desirable embodiments of this invention are described it will be understood that sheets of wood and other suitable fibrous materials may be employed instead of sulfite wood fiber to form the body of the separator, and suitable substances other than sodium silicate may be used to fill the surface pores and prevent passage of sediment through the separator without interfering with the electrolytic action.

I claim:—

1. In a storage battery, separating means comprising two successive porous sections, only one of such sections containing means to resist disintegrating action of the electrolyte and active material, said means also resisting the passage of sediment therethrough without preventing electrolytic action.

2. In a storage battery, separating means comprising successive sections of porous material, alternate sections containing sodium silicate adapted to resist disintegration of said material and also resisting passage of sediment through the separating means without preventing electrolytic action therethrough.

3. A storage battery separator comprising a sheet of porous material having the pores in a surface portion thereof only filled with a substance that will resist the passage of sediment therethrough without preventing electrolytic action therethrough.

4. A storage battery separator having a coating of sodium silicate on the surface thereof that is adapted to face the positive plate of a storage cell.

5. A storage battery separator comprising a sheet of fibrous material containing soluble silicate in the pores of the surface portions thereof only leaving a porous layer intermediate said portions that is untreated with such silicate.

6. A storage battery separator comprising layers of fibrous material alternately treated with sodium silicate and untreated with such silicate.

7. A storage battery separator comprising a sheet of sulfite fibers consisting of outside layers containing sodium silicate and an intermediate layer untreated with such silicate.

8. In a storage battery, an assembly of positive and negative electrodes with separating means between successive electrodes, each of such separating means comprising porous sections, those sections facing the positive electrodes having the pores filled with a substance adapted to resist the passage of sediment therethrough without preventing electrolytic action.

9. In a storage battery, an assembly of positive and negative plates with separating means between successive plates, each of such separating means comprising porous sections, one of such sections abutting against a negative plate and another abutting against a positive plate and carrying a soluble silicate adapted to resist disintegration of the separating means and also adapted to resist the passage of sediment therethrough without preventing electrolytic action between said plates.

In testimony whereof, I affix my signature.

RAYMOND C. BENNER.